(12) United States Patent
Fukumoto et al.

(10) Patent No.: US 6,961,033 B2
(45) Date of Patent: Nov. 1, 2005

(54) GAN GREEN LED DRIVE DEVICE AND OPTICAL TRANSMISSION DEVICE

(75) Inventors: Shigeru Fukumoto, Aichi (JP); Satoru Kato, Aichi (JP); Hiroshi Ito, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 285 days.

(21) Appl. No.: 10/303,854

(22) Filed: Nov. 26, 2002

(65) Prior Publication Data

US 2003/0112209 A1 Jun. 19, 2003

(30) Foreign Application Priority Data

Nov. 27, 2001 (JP) ..................................... P2001-361168

(51) Int. Cl.[7] .............................................. G09G 3/32
(52) U.S. Cl. ...................................................... 345/82
(58) Field of Search ....................... 372/29.011–29.014; 345/82

(56) References Cited

U.S. PATENT DOCUMENTS 4,295,226 A * 10/1981 Dombrowski ............... 398/182
5,843,590 A * 12/1998 Miura et al. ................ 428/698
6,728,494 B2 * 4/2004 Numata et al. ............. 398/182

* cited by examiner

Primary Examiner—Richard Hjerpe
Assistant Examiner—Rodney Amadiz
(74) Attorney, Agent, or Firm—McGinn & Gibb, PLLC

(57) ABSTRACT

The invention provides a GaN green LED drive device comprising: a bias current output unit for outputting a pulse-like bias current having a low level higher by a predetermined value than a zero level; and a peaking unit for peaking the bias current outputted from the bias current output unit to make rise of the bias current higher than a high level and make fall of the bias current lower than the low level to thereby obtain a peaked bias current supplied to a GaN green LED. The bias current is peaked while the low level of the bias current is set at a higher value (10 mA) than that in the related art. Hence, the fall time $t_f$ becomes 6.6 nsec. The fall time $t_f$ can be shortened greatly compared with that in the related art.

17 Claims, 6 Drawing Sheets

GAN GREEN LED DRIVE DEVICE AND OPTICAL TRANSMISSION DEVICE

The present application is based on Japanese Patent Application No. 2001-361168, the entire contents of which is incorporated herein by reference.

BACKGROUND OF THE INVENTION

1. Field of the Invention

The present invention relates to a GaN green LED drive device and an optical transmission device and particularly to a GaN green LED drive device for driving a GaN green LED (light-emitting diode) at a high speed and an optical transmission device using the GaN green LED drive device.

2. Description of the Related Art

An optical transmission device for transmitting and receiving an optical signal through a plastic optical fiber (hereinafter referred to as "POF") which is an optical transmission medium is used in relatively short-distance (not longer than 100 m) optical communication such as inter-device optical communication. The optical transmission device includes a light-emitting device for generating an optical signal, and a light-receiving device for receiving an optical signal from another optical transmission device.

Generally, an AlGaInP red LED is used as the light-emitting device. The AlGaInP red LED can make high-speed response. The AlGaInP red LED, however, has a problem that the emitted light output is reduced greatly in accordance with the temperature change. For example, the wavelength of the emitted light output is reduced by about 20 nm when the temperature change is 100° C. For this reason, transmission loss in the POF varies largely, so that the transmission distance is limited to about 50 m.

On the other hand, a GaN green LED (wavelength: 520 nm) for emitting green light in a low-loss wavelength range in the POP has come onto the market for the display purpose in recent years. It was conceived that the GaN green LED could transmit light by a distance of 100 m or longer, because green light in a low-loss wavelength range in the POF is emitted as well as because the GaN green LED has such characteristic that lowering of the emitted light output and fluctuation of the wavelength due to the temperature change are smaller as compared with the red LED. The GaN green LED, however, has a problem of being bad in trailing edge characteristic.

Figure 7A:
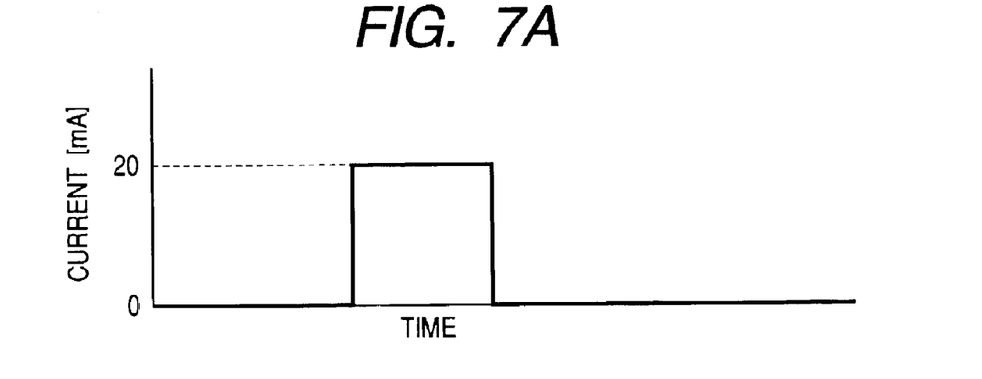
FIG. 7A is a waveform graph of a conventional bias current supplied to the GaN green LED.
Figure 7B:
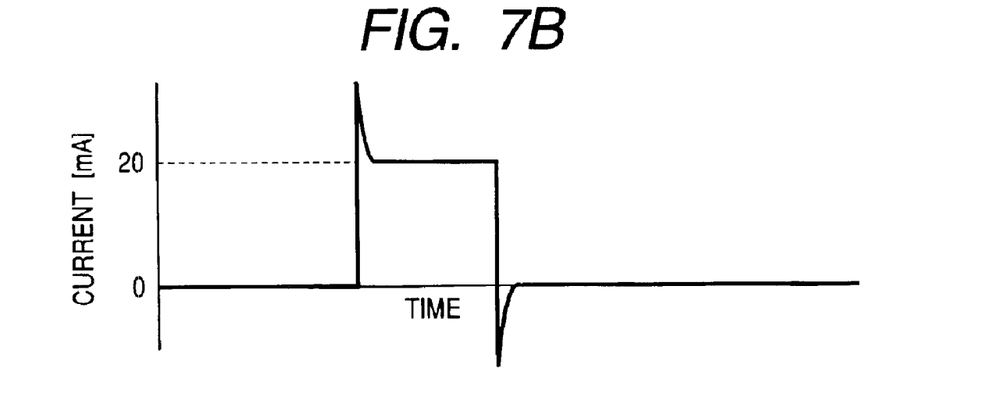
FIG. 7B is a waveform graph of a peaked bias current obtained by peaking the bias current.
Figure 7C:
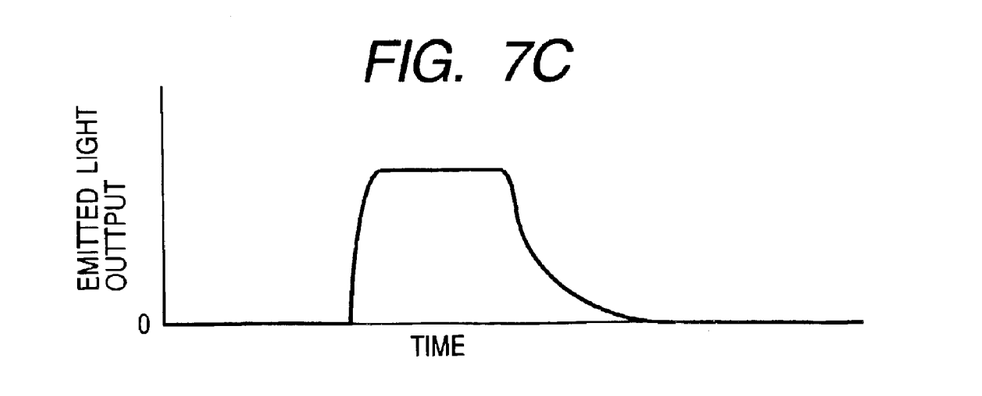
FIG. 7C is a waveform graph of a light output emitted from the GaN green LED.

FIG. 7A is a waveform graph of a conventional bias current supplied to the GaN green LED. The bias current is shaped like a pulse to obtain a digital optical signal. The low level of the bias current is about 0 mA whereas the high level of the bias current is 20 mA. FIG. 7B is a waveform graph of a peaked bias current. FIG. 7C is a waveform graph of a light output emitted from the GaN green LED. As shown in FIG. 7C, the trailing edge of the emitted light output is sharp just after the beginning of the fall but becomes slower with the passage of time after the beginning of the fall. Hence, the trailing edge characteristic of the GaN green LED is very bad.

Figure 8:
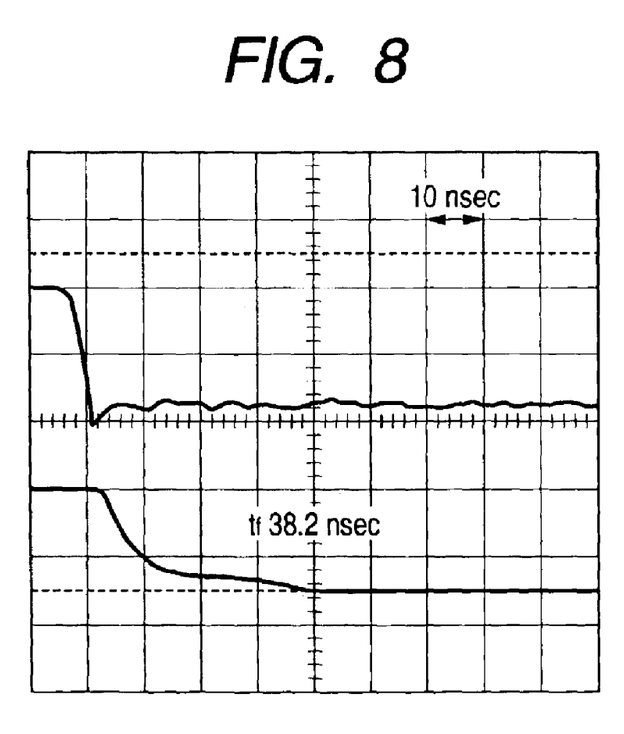
FIG. 8 is a graph showing waveforms for measuring the fall time of the GaN green LED.

FIG. 8 is a graph showing waveforms for measuring the fall time of the GaN green LED. In FIG. 8, the upper trace part shows a waveform of a bias current supplied to the GaN green LED, and the lower trace part shows a waveform of a light output emitted from the GaN green LED. As shown in FIG. 8, the trailing edge characteristic of the light output in a digital operation of the GaN green LED is about 38 nsec in terms of the fall time t, required for changing the output from 90% to 10%. In this case, the transmission speed of an optical signal outputted from the GaN green LED is limited to about 20 Mbps. Hence, the GaN green LED cannot be applied to a high-speed optical communication device;

SUMMARY OF THE INVENTION

The invention is proposed to solve the problems and an object of the invention is to provide a GaN green LED drive device for shortening the fall time of a GaN green LED to drive the GaN green LED at a high speed, and an optical transmission device using the GaN green LED drive device.

According to the invention, the low level of a pulse-like bias current supplied to a GaN green LED is set at a higher value than that in the related art to thereby solve the problems.

Figure 1:
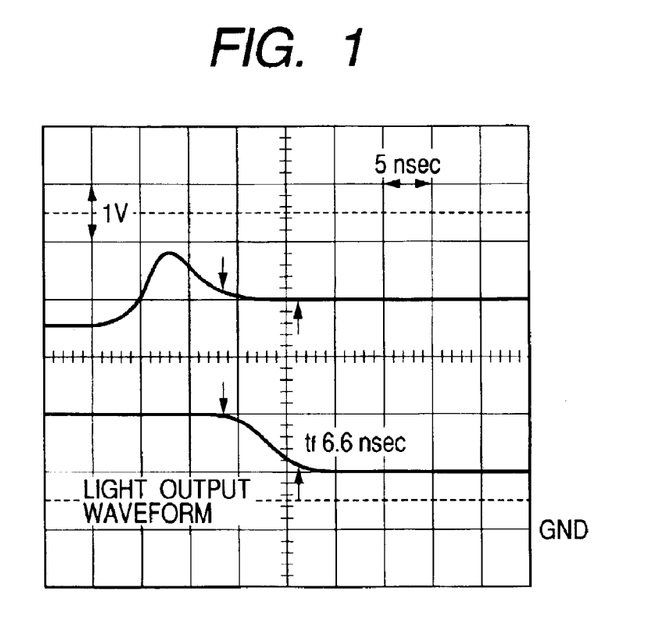
FIG. 1 is a graph showing waveforms for measuring the fall time of a GaN green LED in the case where a bias current is peaked while the low level of the bias current is set at a higher value (10 mA) than that in the related art.

FIG. 1 is a graph showing waveforms for measuring the fall time $t_f$ of the GaN green LED in the case where the pulse-like bias current is peaked while the low level of the pulse-like bias current is set at a higher value (10 mA) than that in the related art. In FIG. 1, the upper trace part shows a waveform of the bias current supplied to the GaN green LED, and the lower trace part shows a waveform of the light output emitted from the GaN green LED. As shown in FIG. 1, the fall time $t_f$ is 6.6 nsec. Hence, the fall time $t_f$ can be shortened greatly compared with that in the related art.

(1) According to the invention, there is provided a GaN green LED drive device having: a bias current output unit for outputting a pulse-like bias current having a low level higher by a predetermined value than a zero level; and a peaking unit for peaking the bias current outputted from the bias current output unit to make the rise of the bias current higher than a high level and make the fall of the bias current lower than the low level to thereby obtain a peaked bias current supplied to a GaN green LED.

In the invention, the bias current output unit operates so that the low level of the bias current supplied to the GaN green LED is selected to be higher than a zero level. Hence, only the sharp region of the trailing edge of the light output emitted from the GaN green LED is used so that the fall time can be shortened.

In the leading edge of the bias current, the peaking unit makes the bias current higher than the high level of the bias current to thereby quicken the rise of the light output emitted from the GaN green LED. In the trailing edge of the bias current, the peaking unit absorbs electric charge to make the bias current lower than the low level of the bias current to thereby quicken the fall of the emitted light output.

In this manner, the bias current is peaked while the low level of the bias current is selected to be higher than the zero level. Hence, particularly the fall time of the GaN green LED can be shortened greatly to drive the GaN green LED at a high speed.

(2) According to the invention, in the GaN green LED drive device as in (1), the bias current output unit selects the low level of the bias current to be higher as the set acting speed of the GaN green LED increases.

The acting speed of the GaN green LED is decided on the basis of the rise time and the fall time. The rise time is substantially constant but the fall time becomes shorter as the low level of the bias current becomes higher. Hence, when the low level of the bias current is selected to be high, the set acting speed of the GaN green LED can be quickened.

(3) According to the invention, in the GaN green LED drive device as in (1) or (2), the bias current output unit outputs a pulse-like bias current having a low level of not lower than 4 mA.

When the acting speed of the GaN green LED is selected so that an optical signal is outputted at the rate of 50 Mbps or higher, it is obvious from the correlation between the acting speed of the GaN green LED and the low level of the bias current that the low level of the bias current must be set to be not lower than 4 mA.

(4) According to the invention, there is provided an optical transmission device having a GaN green LED drive device defined in any one of (1) through (3).

Hence, because the GaN green LED can be driven at a high speed, a high-speed long-distance optical data link system can be achieved.

DETAILED DESCRIPTION OF THE PREFERRED EMBODIMENTS

A preferred embodiment of the invention will be described below in detail with reference to the drawings.

Figure 2:
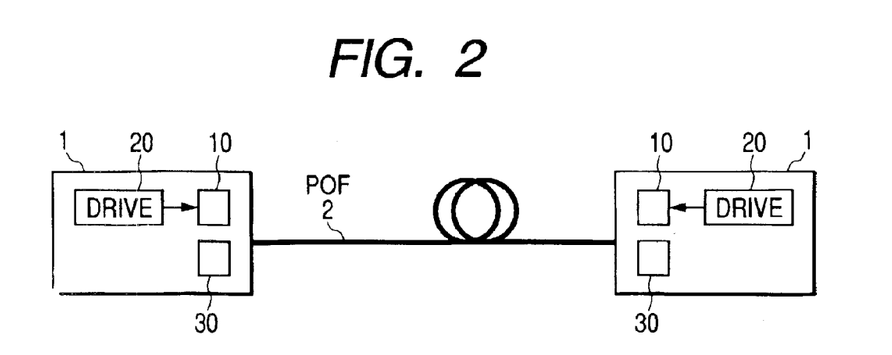
FIG. 2 is a diagram showing the schematic configuration of an optical transmission device according to an embodiment of the invention.

FIG. 2 is a diagram showing the schematic configuration of an optical transmission device 1 according to an embodiment of the invention. The optical transmission device 1 transmits and receives an optical signal through a POF 2 which is an optical transmission medium. The optical transmission device 1 includes a GaN green LED (hereinafter referred to as "GaN green LED") 10 for emitting green light, an LED drive circuit 20 for driving the GaN green LED 10, and a photodiode 30 for receiving light from another light transmission device through the POF 2.

Figure 3:
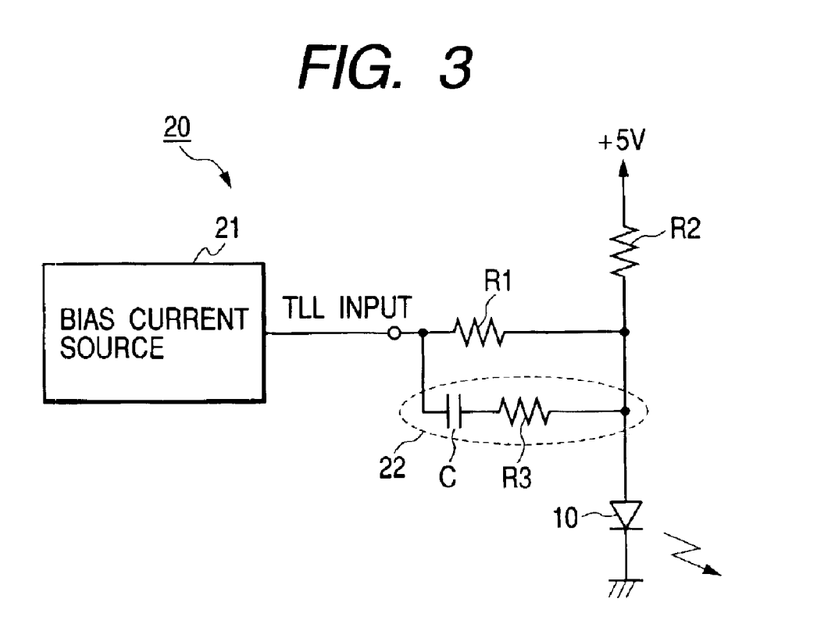
FIG. 3 is a diagram showing a specific example of the circuit configuration of an LED drive circuit.

FIG. 3 is a diagram showing a specific example of the circuit configuration of the LED drive circuit 20. The LED drive circuit 20 has a bias current source 21 for generating a bias current to be supplied to the GaN green LED 10, and a peaking circuit 22 for peaking the bias current.

The bias current source 21 is connected to an anode of the GaN green LED 10 through a resistor R1. The anode of the GaN green LED 10 is supplied with a DC constant voltage of 5 V through a resistor R2. On the other hand, a cathode of the GaN green LED 10 is grounded.

The peaking circuit 22 is connected between the bias current source 21 and the anode of the GaN green LED 10. The peaking circuit 22 is constituted by a series circuit having a capacitor C and a resistor R3. The time constant of the peaking circuit 22 is decided on the basis of the product of the capacitor C and the resistor R3. Specifically, the time constant is preferably selected to be substantially equal to the life time of a minority carrier of the GaN green LED 10.

Incidentally, in the LED drive circuit 20 in this embodiment, the values of the resistors R1, R2 and R3 and the capacitor C are selected to be 308 [Ω], 101 [Ω], 4.7 [Ω] and 68 [pF] respectively.

Upon reception of a TLL input signal from the LED drive circuit 20 configured as described above, the GaN green LED 10 emits an in-phase light output as follows.

Figure 4A:
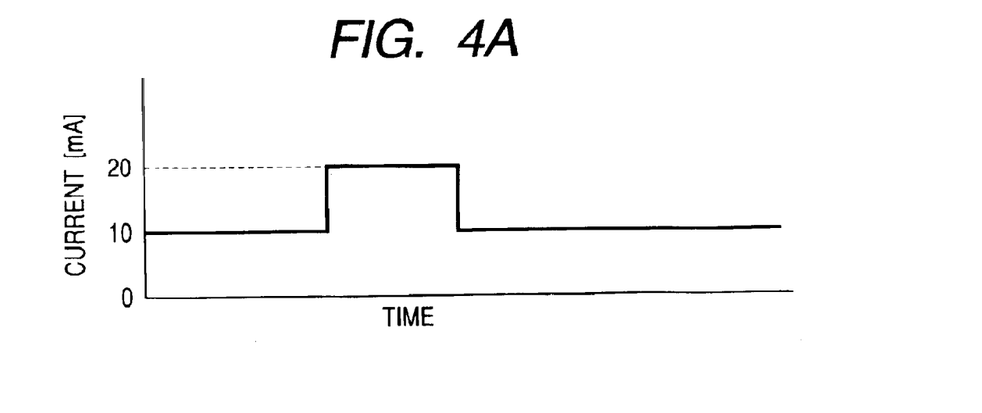
FIG. 4A is a waveform graph of a bias current output from a bias current source 21.
Figure 4B:
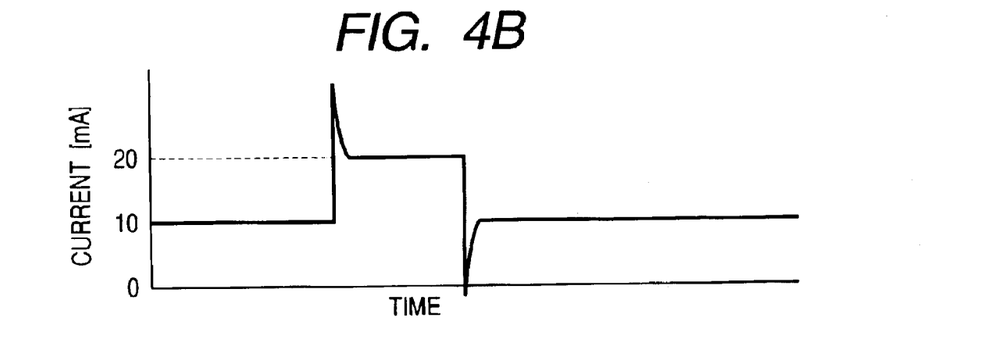
FIG. 4B is a waveform graph of a peaked bias current obtained by peaking the bias current.
Figure 4C:
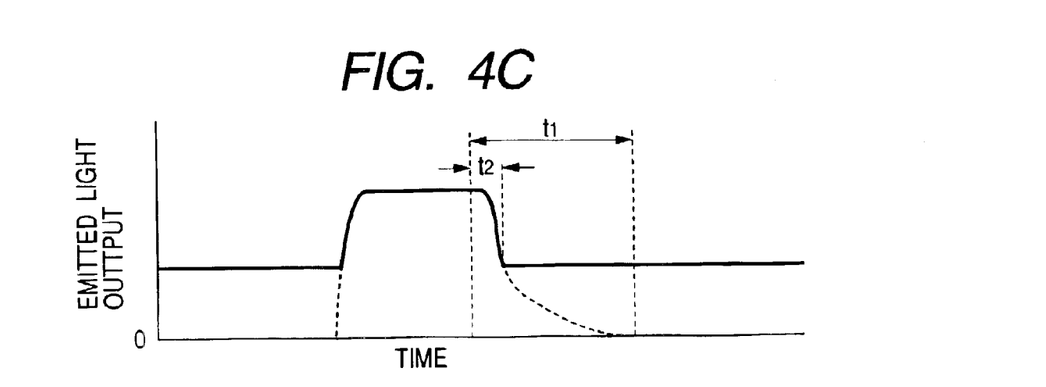
FIG. 4C is a waveform graph of a light output emitted from the GaN green LED.

FIG. 4A is a waveform graph of a bias current outputted from the bias current source 21. The bias current has a low level of 10 mA and a high level of 20 mA. FIG. 4B is a waveform graph of a peaked bias current obtained by peaking the bias current. FIG. 4C is a waveform graph of a light output emitted from the GaN green LED 10.

In the related art, as shown in FIG. 7C, the trailing edge of a light output emitted from the GaN green LED was sharp just after the beginning of the fall but became slower with the passage of time after the beginning of the fall. Therefore, when the LED drive circuit 20 in the embodiment makes the low level of the bias current higher than the zero level, only the sharp portion of the trailing edge of the emitted light output is used so that the fall time which was t, in the related art can be reduced to $t_2$, as shown in FIG. 4C When the bias current source 21 outputs a bias current of 10 mA, the light output emitted from the GaN green LED 10 is small because the voltage applied to the anode of the GaN green LED 10 is low. When the bias current source 21 outputs a bias current of 20 mA, the light output emitted from the GaN green LED 10 becomes large because the voltage applied to the anode of the GaN green LED 10 is high. In this manner, the GaN green LED 10 emits an in-phase light output equal in phase to the bias current.

Figure 5:
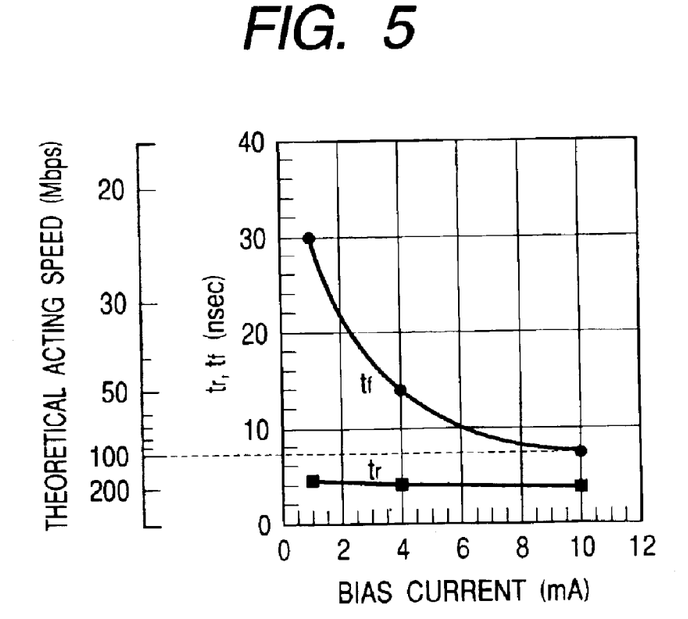
FIG. 5 is a graph showing the relation between rise time $t_r$/fall time $t_f$ and theoretical acting speed BW with respect to a low-level bias current.

FIG. 5 is a graph showing the relation between rise time $t_r$/fall time $t_f$ and theoretical acting speed BW with respect to a low-level bias current. The rise time $t_r$ is substantially constant regardless of the low level of the bias current. The fall time $t_f$ becomes shorter as the low level of the bias current becomes higher. Hence, the GaN green LED 10 can be operated at a higher speed when the low level of the bias current is set to be higher.

In an NRZ (Non-Return-to-Zero) modulation method, the theoretical acting speed BW is calculated by the following expression (1).

$$BW = \frac{0.7}{(t_r + t_f)/2} [\text{bps}] \qquad (1)$$

To operate the GaN green LET) 10 at the rate of 100 Mbps or higher, both the rise time $t_r$ and the fall time $t_f$ must be selected to be not longer than 7 nsec. Since the rise time $t_r$ is constant and about 4 nsec, it is necessary to select the low level of the bias current to be not lower than 10 mA. Incidentally, when the GaN green LED 10 is to be operated at the rate of about 50 Mbps, it is necessary to select the low level of the bias current to be about 4 mA.

Figure 6:
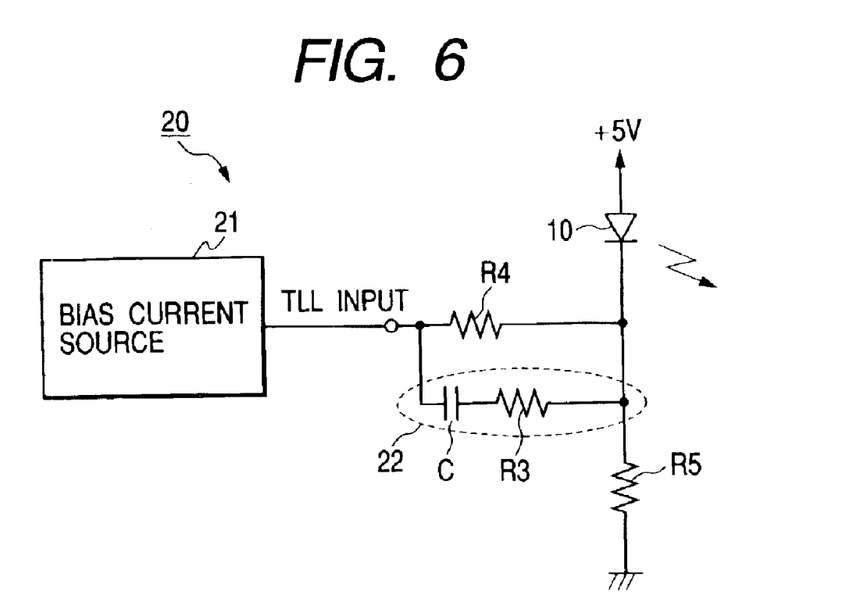
FIG. 6 is a diagram showing another example of the circuit configuration of the LED drive circuit.

The LED drive circuit 20 may be also configured as follows. FIG. 6 is a diagram showing another example of the circuit configuration of the LED drive circuit 20. The LED drive circuit 20 has a bias current source 21 for generating a bias current to be supplied to the GaN green LED 10, and a peaking circuit 22 for peaking the bias current.

The bias current source 21 is connected to a cathode of the GaN green LED 10 through a resistor R4. The cathode of the GaN green LED 10 is grounded through a resistor R5. An anode of the GaN green LED 10 is supplied with a DC constant voltage of 5 V.

The peaking circuit 22 is connected between the bias current source 21 and the cathode of the GaN green LED 10. The peaking circuit 22 is constituted by a series circuit having a capacitor C and a resistor R3. Incidentally, in the LED drive circuit 20, the values of the resistors R4, R5 and R3 and the capacitor C are selected to be 172 [Ω], 78 [Ω], 4.7 [Ω] and 68 [pF] respectively.

Upon reception of a TLL input signal from the LED drive circuit 20 configured as described above, the GaN green LED 10 emits a reversed-phase light output as follows. When the bias current source 21 outputs a bias current of 10 mA, the light output emitted from the GaN green LED 10 becomes large because the voltage applied to the cathode of the GaN green LED 10 is low. When the bias current source 21 outputs a bias current of 20 mA, the light output emitted from the GaN green LED 10 becomes small because the voltage applied to the cathode of the GaN green LED 10 is high. Incidentally, the relation between rise time $t_r$/fall time $t_f$ and theoretical acting speed BW with respect to the low-level bias current is substantially the same as that in the in-phase case.

As described above, the LED drive circuit 20 increases the low level of the bias current by a predetermined value to thereby shorten the fall time $t_f$ of the GaN green LED 10 greatly. As a result, the GaN green LED 10 can be driven at a high speed.

Hence, the optical transmission device 1 having the LED drive circuit 20 can output an optical signal at a wavelength capable of being transmitted through the POF 2 with low loss. In addition, even if the temperature changes, the optical transmission device 1 can suppress both lowering of the emitted light output and fluctuation of the wavelength compared with use of a red LED. Hence, an optical data link system capable of transmitting optical data by a distance of 100 m or longer can be provided inexpensively though the optical data link system could not be provided by use of a red LED in the related art.

Incidentally, the invention is not limited to the embodiment and various changes may be made on design without departing from the scope of claim.

For example, the low level of the bias current is not limited to 4 mA or 10 mA but may be selected to be an optimum value in accordance with the acting speed of the GaN green LED 10. Specifically, the low level of the bias current may be decided in accordance with the fall time t, calculated on the basis of the theoretical acting speed BW substituted in the expression (1). That is, the bias current may be decided on the basis of the theoretical acting speed BW by use of the correlation shown in FIG. 5. According to the correlation shown in FIG. 5, the preferred values of the low level of the bias current are 5 mA, 6 mA, 7 mA and 8.5 mA respectively when, for example, the values of the theoretical acting speed BW are 60 Mbps, 70 Mbps, 80 Mbps and 90 Mbps.

The values of the resistors RI to RS and the capacitor C are not limited to these values. It is a matter of course that the resistors R1 to R5 and the capacitor C may have other values if the operation and effect of the invention can be fulfilled.

In the GaN green LED drive device according to the invention, a pulse-like bias current having a low level larger by a predetermined value than the zero level is outputted. The outputted bias current is peaked so that the rise of the bias current becomes higher than a high level while the fall of the bias current becomes lower than the low level. The peaked bias current is supplied to the GaN green LED. Hence, the fall time of the GaN green LED is shortened greatly so that the GaN green LED can be driven at a high speed.

Moreover, in the GaN green LED drive device according to the invention, the low level of the bias current is selected to be higher as the set acting speed of the GaN green LED becomes higher. Hence, the GaN green LED can be driven at a higher speed.

The optical transmission device according to the invention has the GaN green LED drive device described above. Hence, a high-speed long-distance optical data link system can be achieved, because the GaN green LED can be driven at a high speed.

What is claimed is:

1. A GaN green LED drive device comprising:
    a bias current output unit for outputting a pulse-like bias current having a predetermined low level value higher than a zero value; and
    a peaking unit for peaking said bias current outputted from said bias current output unit to make rise of said bias current higher than a high level value and make fall of said bias current lower than said low level value to thereby obtain a peaked bias current supplied to a GaN green LED,
    wherein said bias current output unit selectively sets said low level value of said bias current based on a predetermined correlation between a set acting speed of the GaN green LED and the bias current.

2. A GaN green LED drive device comprising:
    a bias current output unit for outputting a pulse-like bias current having a predetermined low level value higher than a zero value; and
    a peaking unit for peaking said bias current outputted from said bias current output unit to make rise of said bias current higher than a high level value and make fall of said bias current lower than said low level value to thereby obtain a peaked bias current supplied to a GaN green LED,
    wherein said bias current output unit selects said low level value of said bias current to be higher as a set acting speed of said GaN green LED increases.

3. A GaN green LED drive device according to claim 1, wherein said bias current output unit outputs a pulse-like bias current having a low level value of not lower than 4 mA.

4. An optical transmission device having a GaN green LED drive device defined in claim 1.

5. A GaN green LED drive device according to claim 2, wherein said bias current output unit outputs a pulse-like bias current having a low level value of not lower than 4 mA.

6. A GaN green LED drive device according to claim 1, wherein said bias current output unit selects said low level value of said bias current to be higher as the set acting speed of said GaN green LED increases.

7. A GaN green LED drive device according to claim 2, wherein said bias current output unit selectively sets said low level value of said bias current based on a predetermined correlation between the set acting speed of the GaN green LED and the bias current.

8. A GaN green LED drive device according to claim 1, wherein said predetermined correlation between said set acting speed of the GaN green LED and the bias current is based on a fall time and a rise time of said GaN green LED.

9. A GaN green LED drive device according to claim 1, wherein said predetermined correlation between said set acting speed of the GaN green LED and the bias current is based on a fall time and not a rise time of said GaN green LED.

10. A GaN green LED drive device according to claim 1, wherein said bias current output unit outputs a pulse-like bias current having a low level value of not lower than 5 mA.

11. A GaN green LED drive device according to claim 1, wherein said bias current output unit outputs a pulse-like bias current having a low level value of not lower than 6 mA.

12. A GaN green LED drive device according to claim 1, wherein said bias current output unit outputs a pulse-like bias current having a low level value of not lower than 7 mA.

13. A GaN green LED drive device according to claim 1, wherein said bias current output unit outputs a pulse-like bias current having a low level value of not lower than 8.5 mA.

14. A GaN green LED drive device according to claim 1, wherein said bias current output unit outputs a pulse-like bias current having a low level value of not lower than 10 mA.

15. An optical transmission device having a GaN green LED drive device defined in claim 2.

16. A GaN green LED drive device comprising:

a GaN green LED;

means for outputting a pulse-like bias current having a predetermined low level value higher than a zero value; and means for peaking said bias current outputted from said means for outputting to make rise of said bias current higher than a high level value and make fall of said bias current lower than said low level value to thereby obtain a peaked bias current supplied to the GaN green LED, wherein said means for outputting selectively sets said low level value of a bias current based on a predetermined correlation between a set acting speed of the GaN green LED and the bias current.

17. The GaN green LED drive device according to claim 16, wherein said means for outputting selectively sets said low level value of said bias current to be higher as the set acting speed of said GaN green LED increases.

* * * * *